(12) United States Patent
Katsuta

(10) Patent No.: US 6,389,357 B1
(45) Date of Patent: May 14, 2002

(54) VEHICLE NAVIGATION SYSTEM

(75) Inventor: Keiichiro Katsuta, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/689,899

(22) Filed: Oct. 13, 2000

(30) Foreign Application Priority Data

Oct. 15, 1999 (JP) .......................... 11-294395

(51) Int. Cl.⁷ .......................... G01C 21/00; G08G 1/09
(52) U.S. Cl. .................. 701/209; 701/201; 701/211; 340/990; 340/995
(58) Field of Search .................. 701/209, 201, 701/202, 205, 208, 211; 340/990, 995

(56) References Cited

U.S. PATENT DOCUMENTS 5,931,888 A * 8/1999 Hiyokawa .................. 701/208

* cited by examiner

*Primary Examiner*—Tan Nguyen
(74) *Attorney, Agent, or Firm*—Morgan, Lewis & Bockius LLP

(57) ABSTRACT

A vehicle navigation system capable of retrieving a route interconnecting a starting location and a destination by way of en route points, the starting location, destination, and en route points being set by a user, and displaying a retrieved route on a map display screen, the system including: an operation analysis section 21 for determining whether settings are made to display the entire route interconnecting the starting location and the destination by way of en route points or to display a route on a per-segment basis, such as a route segment interconnecting the starting location and one of the en route points, a route segment interconnecting en route points, or a route segment interconnecting one of the en route points and the destination; and a display control section 24 which extracts, from among the retrieved route segments, a route segment along which the vehicle is currently driving when the display determination device determines that a route is to be displayed on a per-segment basis, to thereby make the route segment distinguishable from the other route segments.

12 Claims, 7 Drawing Sheets

FLOWCHART OF OPERATIONS PERTAINING TO FIRST EXAMPLE DISPLAY

BLOCK DIAGRAM SHOWING CONFIGURATION OF CAR NAVIGATION SYSTEM ACCORDING TO AN EMBODIMENT

FLOWCHART OF OPERATIONS PERTAINING TO FIRST EXAMPLE DISPLAY

FIG. 3
EXAMPLE DISPLAY (1) PRODUCED WHEN SETTINGS ARE MADE SO AS TO DISPLAY A ROUTE ON A PER-SEGMENT BASIS

DISPLAY ROUTE SEGMENT ALONG WHICH VEHICLE IS CURRENTLY DRIVING, THROUGH USE OF SOLID LINES

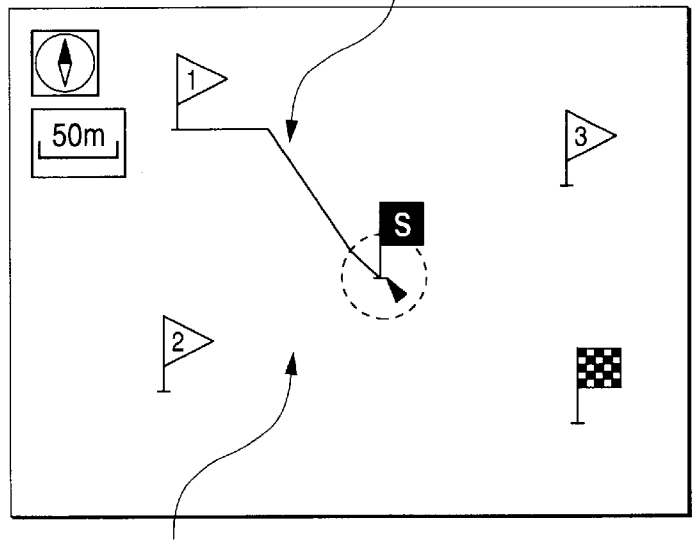

SEGMENTS OTHER THAN CURRENT DRIVE ROUTE SEGMENT ARE NOT DISPLAYED

FIG. 4
EXAMPLE DISPLAY PRODUCED WHEN SETTINGS ARE MADE SO AS TO DISPLAY ENTIRELY OF A ROUTE

DISPLAY ENTIRE ROUTE IN SOLID LINES

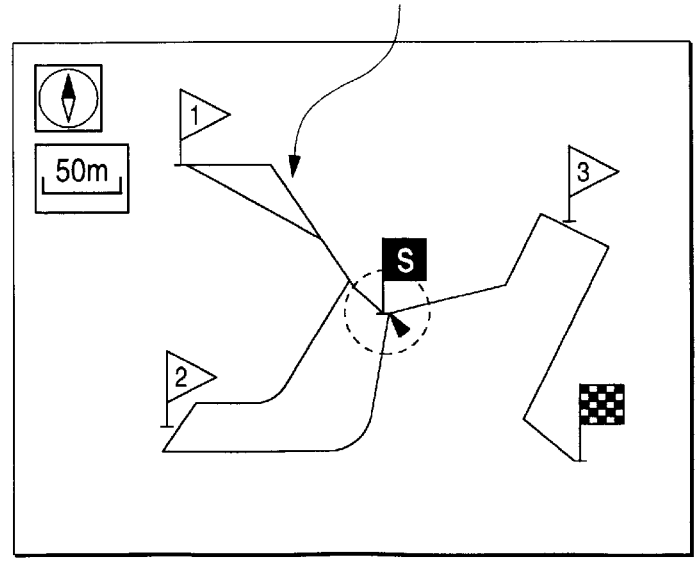

EXAMPLE DISPLAY (2) PRODUCED WHEN SETTINGS ARE
MADE SO AS TO DISPLAY A ROUTE ON A PER-SEGMENT BASIS

DISPLAY ONLY ROUTE SEGMENT ALONG WHICH VEHICLE IS CURRENTLY
DRIVING, THROUGH USE OF SOLID LINES OF DIFFERENT COLOR

FIG. 8
EXAMPLE DISPLAY (3) PRODUCED WHEN SETTINGS ARE MADE SO AS TO DISPLAY A ROUTE ON A PER-SEGMENT BASIS

DISPLAY ROUTE SEGMENT ALONG WHICH VEHICLE IS CURRENTLY DRIVING, THROUGH USE OF SOLID LINES

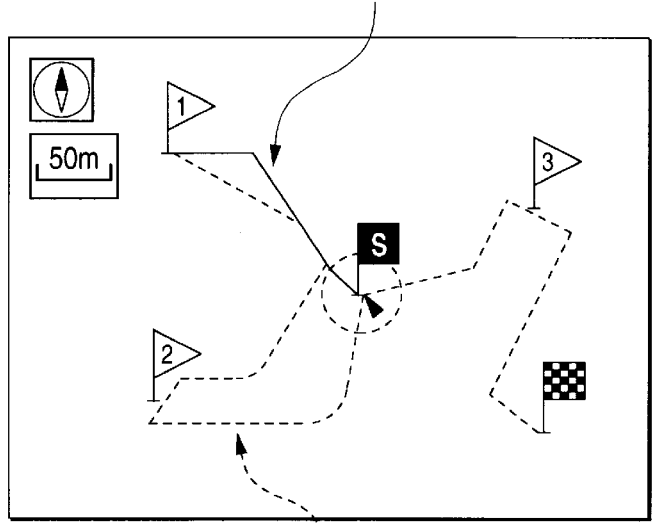

DISPLAY ROUTE SEGMENTS OTHER THAN ROUTE SEGMENT ALONG WHICH VEHICLE IS CURRENTLY DRIVING, IN BROKEN LINES

FIG. 9
CONVENTIONAL ROUTE DISPLAY EXAMPLE

DISPLAY ALL ROUTE SEGMENTS IN SOLID LINES

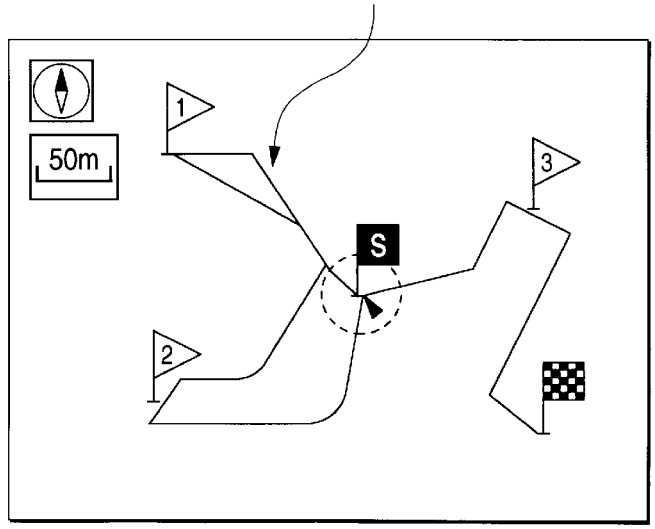

STARTING LOCATION    DESTINATION    EN ROUTE POINTS 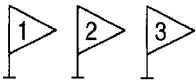

VEHICLE NAVIGATION SYSTEM

BACKGROUND OF THE INVENTION

1. Technical Field

The present invention relates to a vehicle navigation system, and more particularly, to a searched route display method.

2. Related Art

A related vehicle navigation system (as developed by Yazaki Corporation of Japan) displays a road map on a map display screen while the current position of a vehicle is maintained in the center. In accordance with movement of a vehicle, a road map is scrolled while the position of the vehicle is maintained in the center, thereby affording convenience, such as the provision of road information, to a user in retrieving a route.

The vehicle navigation system is equipped with a route search engine, there enabling retrieval of a route from a starting location to a destination by way of en route points, the starting location, destination, and en route points being set by the user, and display of a retrieved route on a map display screen.

For example, as shown in FIG. 9, according to a related retrieved route display method, all the retrieved route segments from a starting location (Flag S) to a destination (Goal Checkered Flag) by way of en route points (Numbered Flags) are uniformly indicated by solid lines.

However, according to a known retrieved route display method which shows all the retrieved route segments uniformly through use of solid lines, a route display becomes complicated if the number of en route points is increased. A segment between the starting location and an en route point, a segment between en route points, and a segment between n en route point and a destination become difficult to distinguish from each other.

SUMMARY OF THE INVENTION

The present invention has been conceived to solve such a drawback of the background art and is aimed at providing a vehicle navigation system for enabling display of a route segment along which a vehicle is currently driving and all retrieved route segments, as well.

The present invention provides a vehicle navigation system capable of retrieving a route interconnecting a starting location and a destination by way of en route points, the starting location, destination, and en route points being set by a user, and displaying the retrieved route on a map display screen, the system including:

a display determination device for determining whether settings are made to display all route segments interconnecting the starting location and the destination by way of en route points or to display a route on a per-segment basis, such as a route segment interconnecting the starting location and one of en route points, a route segment interconnecting en route points, or a route segment interconnecting one of the en route points and the destination; and a display control device which extracts, from among the retrieved route segments, a route segment along which the vehicle is currently driving when the display determination device determines that a route is to be displayed on a per-segment basis, to thereby make the route segment distinguishable from the other route segments.

The present invention enables a user to determine whether to display all route segments or to display a route on a per-segment basis. If display of a route on a per-segment basis is selected, a route segment along which a vehicle is currently driving is displayed so as to become distinguishable from the other route segments. Consequently, the vehicle is guided along a route in an easily-readable manner.

Preferably, the display control device displays only the route segment along which the vehicle is currently driving and does not display the other route segments.

In a case where display of a route on a per-segment basis is selected, only a route segment along which the vehicle is currently driving is displayed. Consequently, a vehicle is guided along a route in an easily-readable manner.

Preferably, the display control device displays, through use of a solid line, the route segment along which the vehicle is currently driving.

According to the present invention, the route segment along which the vehicle is currently driving is displayed in a very easily-distinguishable manner, thus rendering a display much easier to read.

BRIEF DESCRIPTION OF THE DRAWINGS

FIG. 3 is an illustration showing an example display (1) produced when settings are made so as to display a route on a per-segment basis.

FIG. 4 is an illustration showing an example display produced when settings are made so as to display the entirety of a route.

FIG. 8 is an illustration showing an example display (3) produced when settings are made so as to display a route on a per-segment basis.

FIG. 9 is a descriptive illustration showing an example display of a conventionally-searched route.

DETAILED DESCRIPTION OF PREFERRED EMBODIMENT

Figure 1:
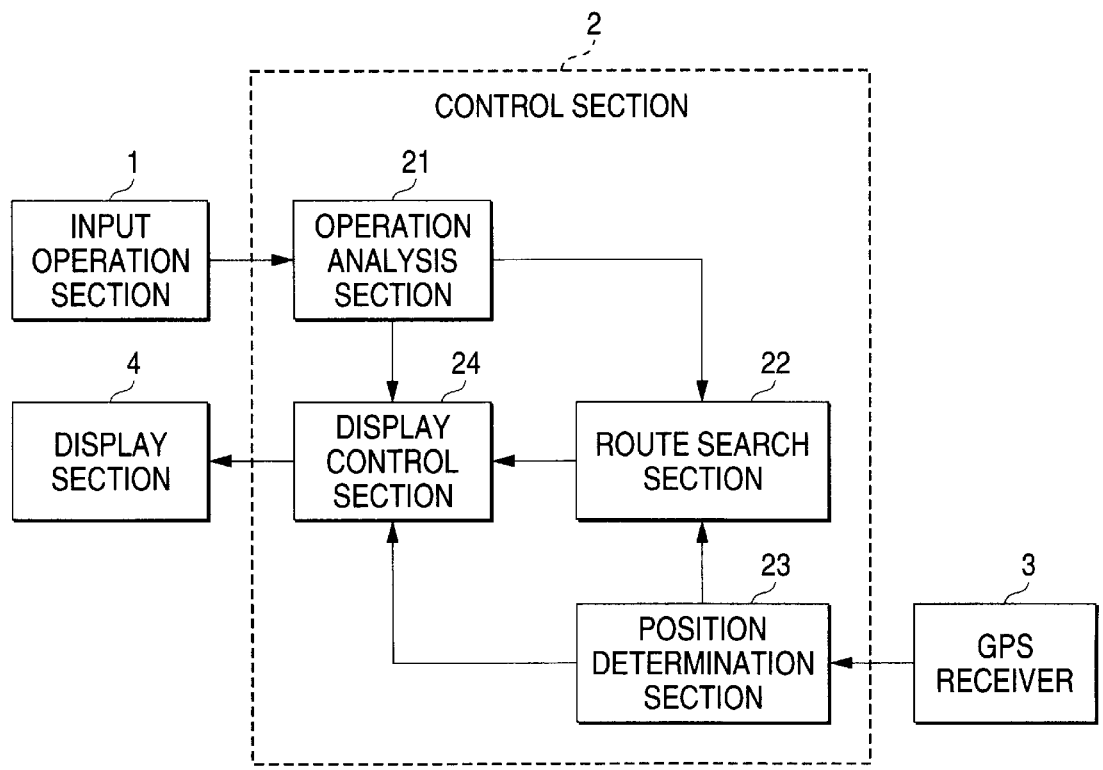
FIG. 1 is a block diagram showing the configuration of a vehicle navigation system according to an embodiment of the present invention.

FIG. 1 is a block diagram showing the configuration of a vehicle navigation system according to an embodiment of the present invention.

As shown in FIG. 1, the vehicle navigation system according to the present embodiment includes: an input operation section 1 by way of which a user performs various setting operations relating to a display or functions; a control section 2 which has a central processing unit (CPU) and memory (ROM and RAM) for storing processing programs and various data, and which embodies various functions of the navigation system in accordance with the settings performed by way of the input operation section 1; a GPS receiver 3 which receives GPS radio waves transmitted from a GPS satellite or a FM broadcast of DGPS and outputs the thus-received signal to the control section 2; and a display section 4 for displaying on the map display screen display data output from the control section 2.

The control section 2 includes, as elements for embodying functions pertaining to a route display according to the present embodiment, an operation analysis section 21, a route search section 22, a position determination section 23, and a display control section 24.

The operation analysis section 21 analyzes setting details entered by way of the input operation section 1. A request for route retrieval is delivered to the route search section 22. The type of route display (e.g., display of an entire route, or display of a route on a per-segment basis) is delivered to the display control section 24. The position determination section 23 determines the position of the vehicle (i.e., the latitude and longitude of the vehicle) on the basis of the signal received by way of the GPS receiver 3. The thus-determined vehicle position information is delivered to the route search section 22 and the display control section 24.

The route search section 22 is provided with a map database and a route search engine and retrieves a route (from a starting location, en route points, and a destination) in response to a route retrieval request issued by the operation analysis section 21. The thus-retrieved route is delivered to the display control section 24. The display control section 24 generates display data pertaining to the route retrieved by the route search section 22, in accordance with the type of route display output from the operation analysis section 21, thus outputting the display data to the display section 4. Correspondence between the elements of the foregoing vehicle navigation system and features described in claims 1 through 3 is as follows: a display determination device corresponds to the operation analysis section 21, and a display control device corresponds to the display control section 24.

Figure 2:
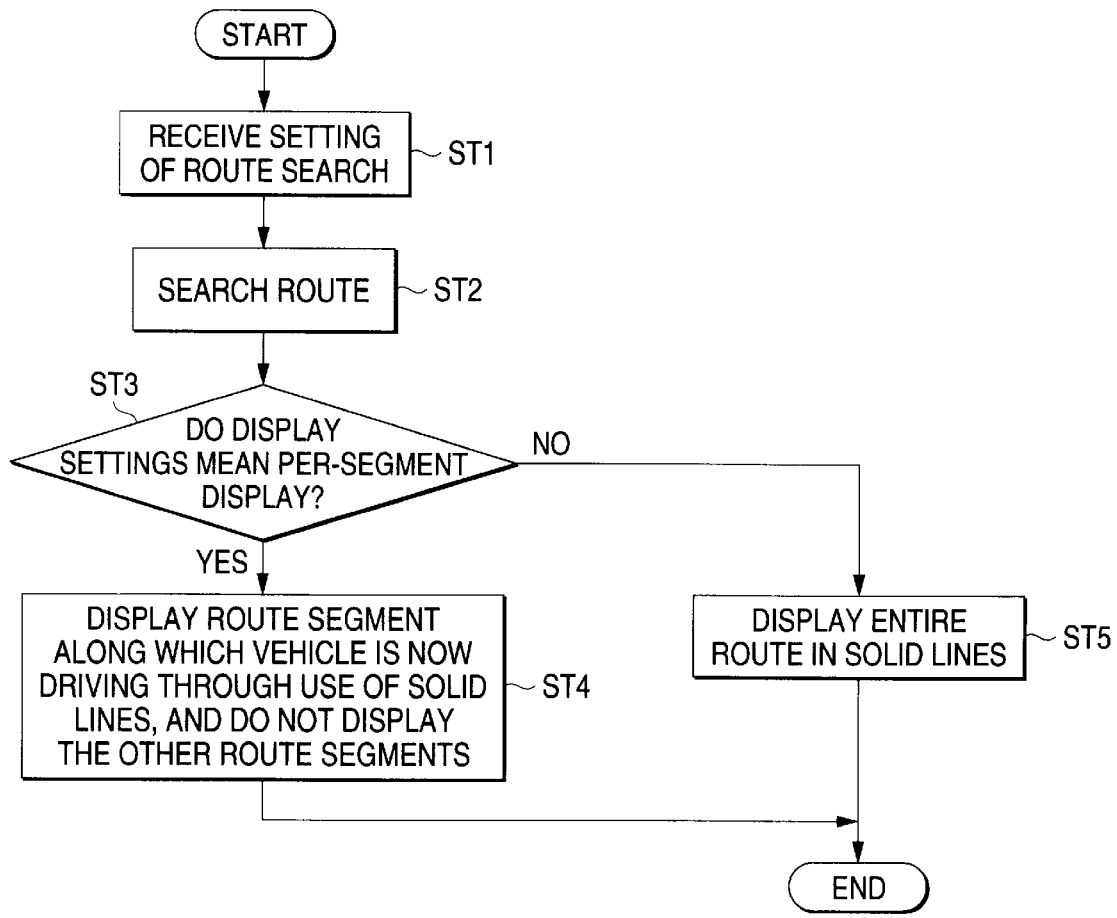
FIG. 2 is a flowchart of operations pertaining to a first example display.
Figure 5:
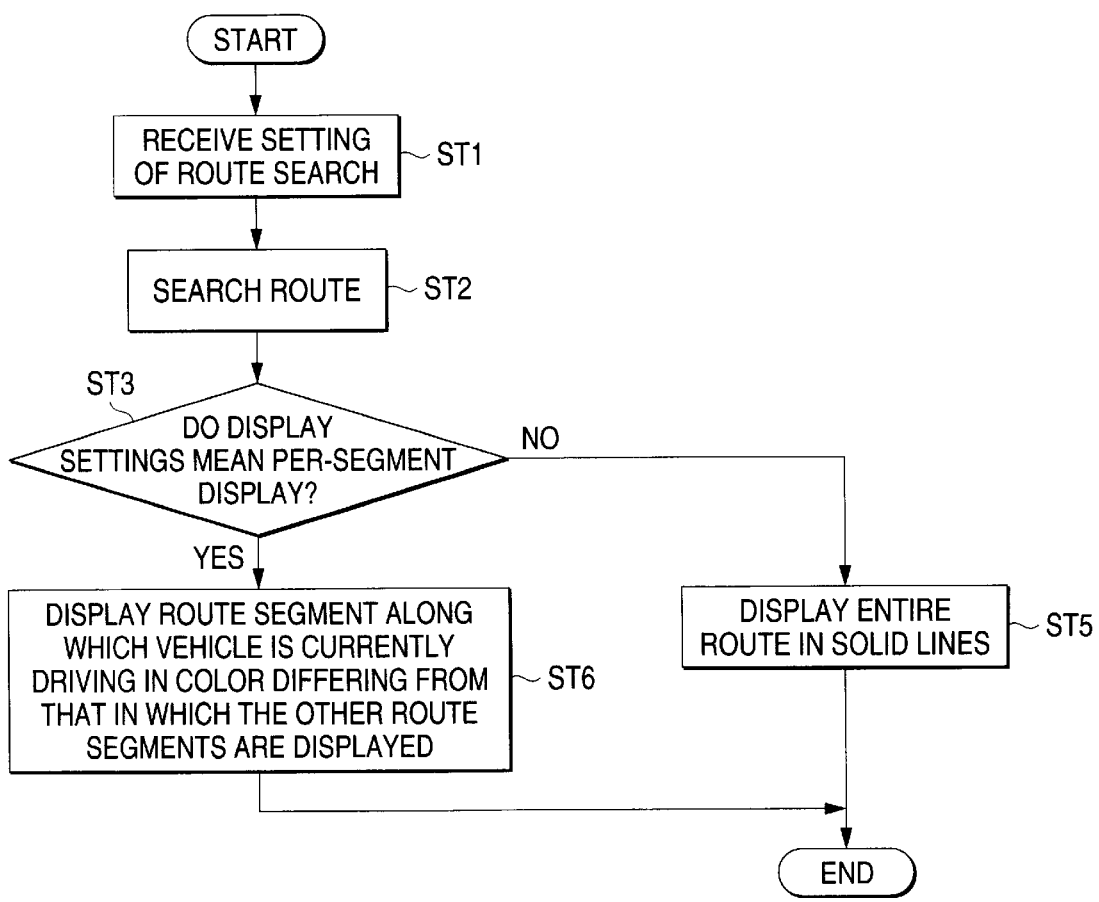
FIG. 5 is a flowchart of operations pertaining to a second example display.
Figure 6:
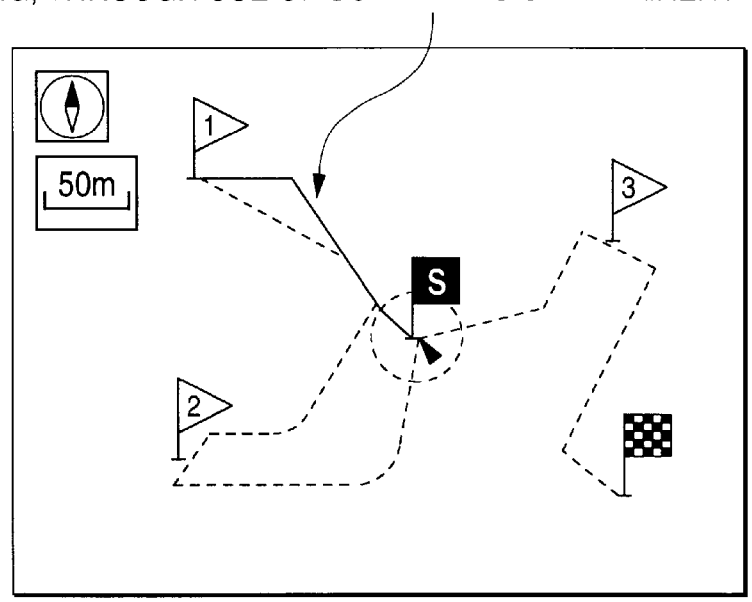
FIG. 6 is an illustration showing an example display (2) produced when settings are made so as to display a route on a per-segment basis.
Figure 7:
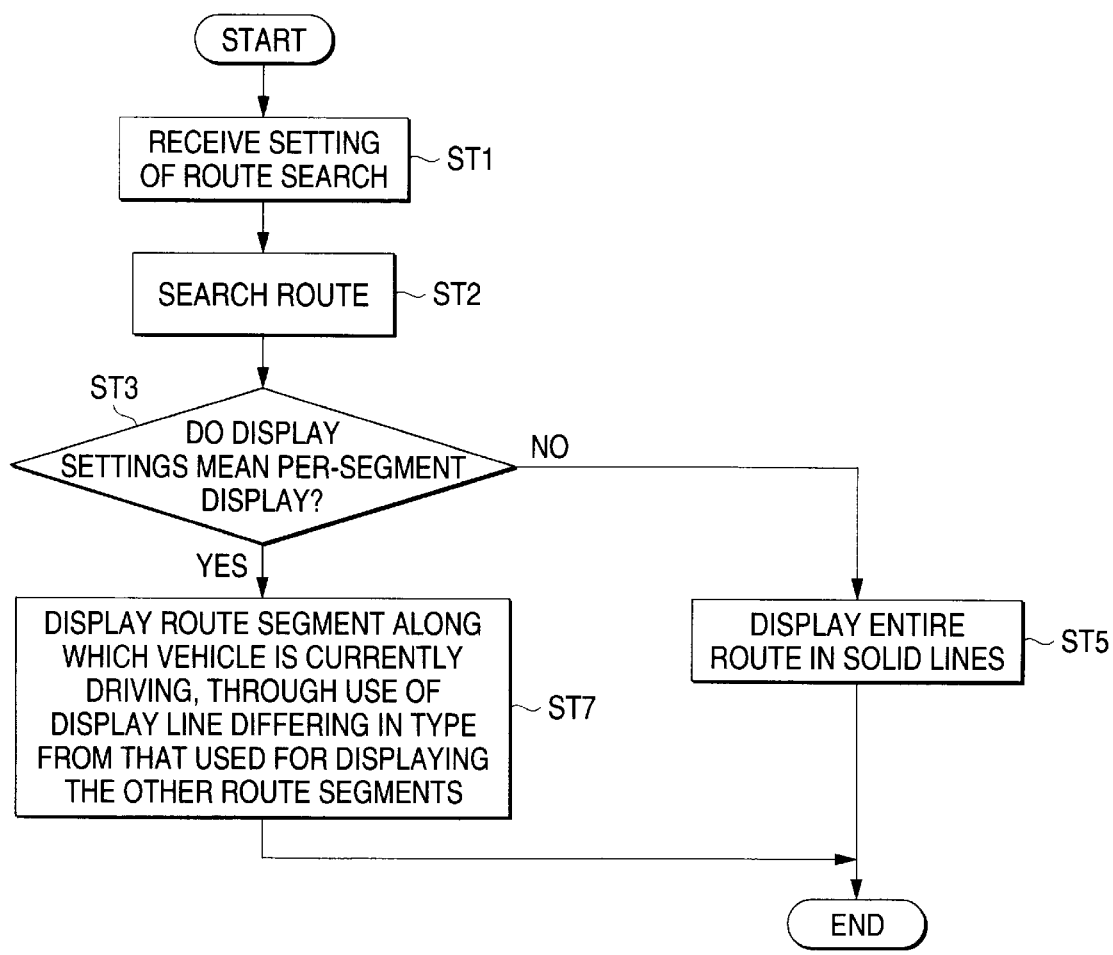
FIG. 7 is a flowchart of operations pertaining to a third example display.

The operation of the vehicle navigation system will now be described by reference to FIGS. 1 through 8. In the present embodiment, three example displays are described. FIGS. 2 through 4 illustrate a first example display; FIGS. 5 and 6 illustrate a second example display; and FIGS. 7 and 8 illustrate a third example display.

First Example Display

A first example display will now be described by reference to FIGS. 1 through 4. FIG. 2 is a flowchart of operations pertaining to the first example display. FIG. 3 is an example display (1) produced when settings are made so as to display a route on a per-segment basis. FIG. 4 is an example display produced when settings are made so as to display the entirety of a route.

When the user sets a route retrieval and the type of route display by way of the input operation section 1, the settings are analyzed by the operation analysis section 21 (step ST1). The operation analysis section 21 delivers a route search request to the route search section 22, and the type of route display is delivered to the display control section 24. In connection with a route search setting, the user sets a starting location, en route points, and a destination. Further, in connection with the type of route display, the user selects either display of the entire route interconnecting the starting location and the destination by way of the en route points, or display of the route on a per-segment basis, such as a segment interconnecting the starting location and an en route point, a segment interconnecting en route points, and a segment interconnecting an en route point and the destination (i.e., a per-segment display).

Upon receipt of a route search request from the operation analysis section 21, the route search section 22 activates a route search engine, to thereby retrieve a route from the starting location to the destination by way of the en route points in response to the route search request, on the basis of the vehicle position information output from the position determination section 23 and by reference to the map database. The thus-retrieved route is delivered to the display control section 24 (step ST2).

The display control section 24 determines whether or not the type of route display output from the operation analysis section 21 is per-segment display (step ST3). In a case where the type of route display is a per-segment display (YES is selected in step ST3), a route segment along which the vehicle is currently driving is extracted from the searched routes segment output from the route search section 22. There are prepared display data for displaying only the route segment along which the vehicle is currently driving, in a solid line, and the thus-prepared display data are delivered to the display section 4.

As shown in, for example, FIG. 3, in a case where a vehicle is driving over a segment from the starting location (Mark S Flag) to a first en route point (Flag 1), only the segment from the starting location (Mark S Flag) to the first en route point (Flag 1) is indicated in a solid line. In other segments, only numbered flags showing en route points and a goal flag showing a destination are displayed, and no indication line for interconnecting the numbered flags and the goal flag are displayed (step ST4). As a result, a route guide is displayed in a easily-readable manner.

In a case where the type of route display is display of an entire route (NO is selected in step ST3), the display control section 24 prepares display data for displaying all the route segments searched by the route search section 22 and sends the thus-prepared display data to the display section 4.

As shown in, for example, FIG. 4, all the route segments interconnecting the starting location (Mark S Flag), the en route points (Flags 1, 2, and 3), and the destination (Goal Flag) are displayed (step ST5).

Second Example Display

A second example display will be described by reference to FIG. 1 and FIGS. 4 through 6. FIG. 5 is a flowchart of operations pertaining to a second example display. FIG. 6 shows an example display (2) produced when settings are made so as to display a route on a per-segment basis.

In the drawings, the second display example differs from the first display example in terms of only per-segment display. In other respects, the first display example is identical with the second display example. Here, explanation will be given of only a difference unique to the second display example.

In a case where the type of route display is a per-segment display (YES is selected in step ST3), the display control section 24 divides the route searched by the route search section 22 into a route segment along which the vehicle is currently driving (hereinafter often referred to as a "current drive route segment") and the other route segments, on the basis of the vehicle position information output from the position determination section 23. The display control section 24 prepares display data for displaying a current drive route segment in a color differing from that in which the other route segments are displayed. The thus-prepared display data are sent to the display section 4.

As shown in, for example, FIG. 6, all the route segments are displayed. In a case where the vehicle is currently driving along a route segment interconnecting the starting location (Mark S Flag) to the first en route point (Flag 1), the route interconnecting the starting location (Mark S Flag) to the first en route point (Flag 1) is displayed in a color differing from that in which the other segments are displayed; for example, through use of a solid line (step ST6). Consequently, the vehicle is guided along a route in an easily-readable manner.

In a case where the type of route display is display of an entire route (NO is selected in step ST3), all the route segments are displayed in the manner as shown in FIG. 4, as in the case of the first example display (step ST5).

Third Example Display

A third example display will be described by reference to FIGS. 1, 4, 7, and 8. FIG. 7 is a flowchart of operations pertaining to a third example display. FIG. 8 shows an example display (3) produced when settings are made so as to display a route on a per-segment basis.

In the drawings, the third display example differs from the first display example in terms of only per-segment display. In other respects, the third display example is identical with the first display example. Here, explanation will be given of only a difference unique to the third display example.

In a case where the type of route display is a per-segment display (YES is selected in step ST3), the display control section 24 divides the route searched by the route search section 22 into a current drive route segment and the other route segments, on the basis of the vehicle position information output from the position determination section 23. The display control section 24 prepares display data for displaying a current drive route segment in a line variation differing from that in which the other route segments are displayed. The thus-prepared display data are sent to the display section 4.

As shown in, for example, FIG. 8, all the route segments are displayed. In a case where the vehicle is currently driving along a route segment interconnecting the starting location (Mark S Flag) to the first en route point (Flag 1), the route interconnecting the starting location (Mark S Flag) to the first en route point (Flag 1) is displayed through use of, for example, a solid line, and the other segments are displayed through use of, for example, broken lines (step ST7). Consequently, the vehicle is guided along the route in an easily-readable manner.

In a case where the type of route display is display of an entire route (NO is selected in step ST3), all the route segments are displayed in the manner as shown in FIG. 4, as in the case of the first example display (step ST5).

As has been described above, at the time of display of a searched route, the present invention enables a user to selectively set whether to display the entire route or to display the route on a per-segment basis. In a case where display of a route on a per-segment basis is selected, a route segment along which a vehicle is currently driving can be displayed so as to become distinguished from the other route segments.

Preferably, only a route segment along which the vehicle is currently driving is displayed, and the other routes are not displayed. Consequently, the vehicle can be guided along a route in an easily-readable manner.

Preferably, a route segment along which the vehicle is currently driving is displayed through use of a solid line. Hence, the route segment can be readily distinguished from the other, surrounding route segments, thus enabling the user to easily read the current drive route segment.

What is claimed is:

1. A vehicle navigation system capable of retrieving a route interconnecting a starting location and a destination by way of at least one of en route point, and displaying a retrieved route on a map display screen, said system comprising:

a display determination device determining whether settings are set to display an entire route interconnecting the starting location and the destination by way of the at least one en route point, or to display a per-segment basis route; and a display control device extracting a displayed route segment along which a vehicle is currently driving and displaying the displayed route segment which distinguishable from the other route segment when said display determination device determines that the settings are set to display the per-segment basis route.

2. A vehicle navigation system according to claim 1, wherein said display control device displays the displayed route segment and does not display the other route segments.

3. A vehicle navigation system according to claim 1, wherein said display control device displays the displayed route segment with a solid line.

4. A vehicle navigation system according to claim 3, wherein said display control device displays the other route segment with a broken line.

5. A vehicle navigation system according to claim 1, wherein said display control device displays the displayed route segment and the other route segment in different collar each other.

6. A vehicle navigation system according to claim 1, wherein the per-segment basis route is defined by one of a route segment interconnecting the starting location and one of the at least one en route point, a route segment interconnecting the en route points, and a route segment interconnecting one of the at least one en route point and the destination.

7. A vehicle navigation system according to claim 1, wherein the starting location, the destination, and the at least one en route point are set by user.

8. A method of displaying a route interconnecting a starting location and a destination by way of at least one of en route point on a map display screen, the route being retrieved by a vehicle navigation system, said method comprising the steps of:

determining whether settings are set to display an entire route interconnecting the starting location and the destination by way of the at least one en route point, or to display a per-segment basis route; and extracting a displayed route segment along which a vehicle is currently driving and display the displayed route which the other route segment when the settings are set to display the per-segment basis route.

9. A method of displaying a route according to claim 8, wherein the displayed route segment is displayed and the other route segment is not displayed.

10. A method of displaying a route according to claim 8, wherein the displayed route segment is displayed with a solid line.

11. A method of displaying a route according to claim 10, wherein the other route segment is displayed with a broken line.

12. A method of displaying a route according to claim 8, wherein the displayed route segment and the other route segment are displayed in different collar each other.

* * * * *